April 4, 1950        A. H. BRANDON        2,502,775
METHOD OF TESTING WELL TUBING
Filed Aug. 2, 1948
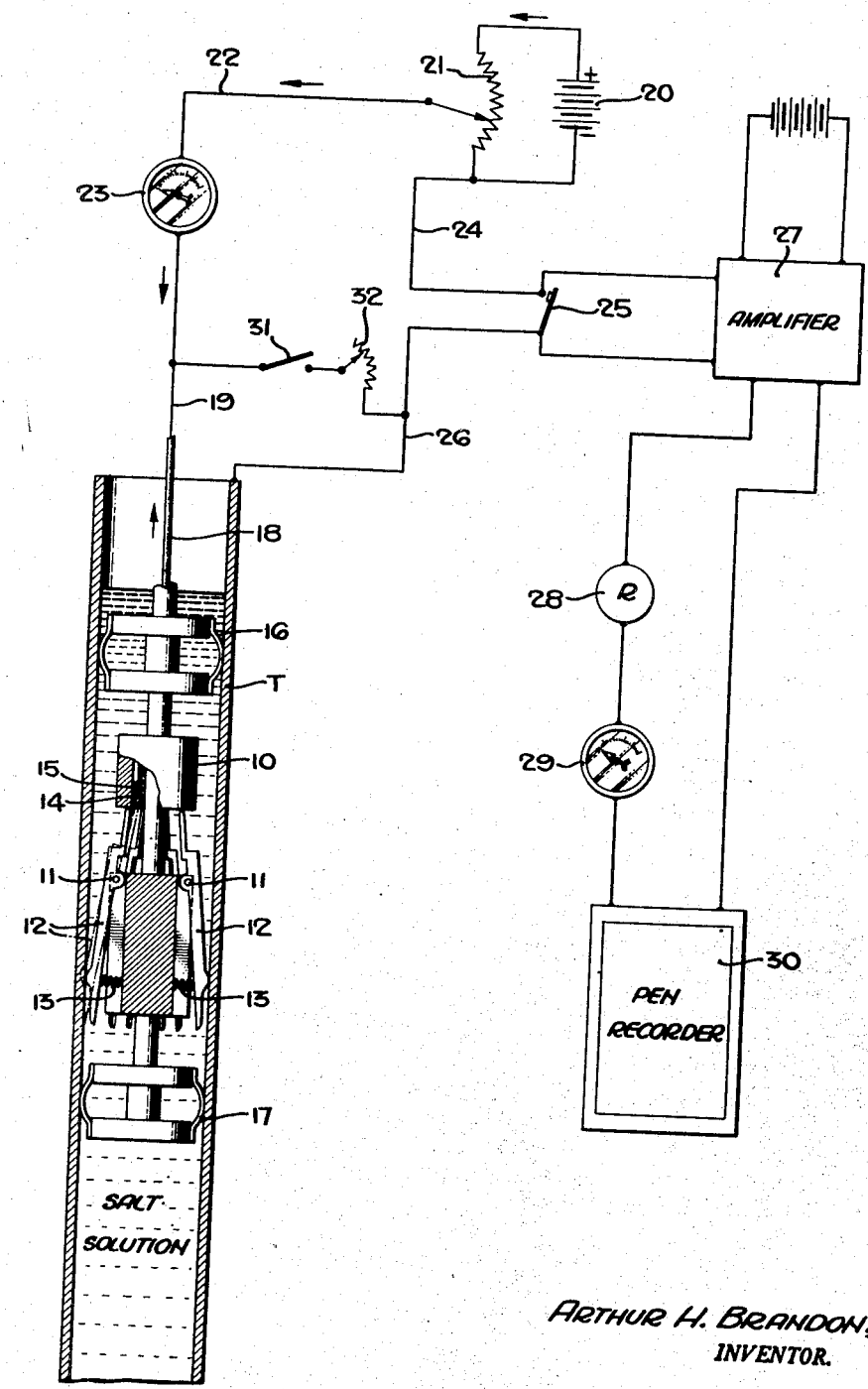
ARTHUR H. BRANDON,
INVENTOR.
BY
Hazard & Miller
ATTORNEYS Patented Apr. 4, 1950

2,502,775

UNITED STATES PATENT OFFICE 2,502,775

METHOD OF TESTING WELL TUBING

Arthur H. Brandon, Los Angeles, Calif.

Application August 2, 1948, Serial No. 42,054

2 Claims. (Cl. 33—178)

This invention relates to a method and apparatus for testing well tubing and is applicable to various types of tools adapted to be lowered into wells containing salt water wherein electrical circuits are to be closed in the well to operate surface indicators.

In practically all oil wells that are deeply drilled, salt water is encountered to a greater or less degree and near the bottom of some wells the water encountered is practically pure salt water and in a state of nearly complete saturation. In the operation of a tubing tester in such wells which may be of the character described in the article entitled "Determining Wall Thickness of Tubing in Wells" by Wallace A. Sawdon, appearing in The Petroleum Engineer for July, 1944, when salt water is encountered by the tubing tester it functions as an excellent conductor across the points of the circuit-closing means so that, although the circuit may not have been mechanically closed by the fingers of the tubing tester, it is nevertheless actually closed by the conductivity of the salt water encountered. Consequently the surface recorder or indicator will falsely indicate defective tubing or the difference in the reading of the surface indicator when the circuit is mechanically closed over the reading obtained when the circuit is mechanically open but electrically closed by the salt water is so slight that the locations of the defective tubing are hardly discernible.

It is therefore an object of the present invention to provide an improved method and apparatus whereby readings of this character may be obtained with great accuracy despite the short-circuiting effect of the salt water that may be encountered in the well.

More specifically, an object of the invention is to provide an improved apparatus and method of this character wherein the applied voltage to the circuit-closing means that is lowered into the well is of a very low value. Heretofore in instruments of this character the applied voltage has normally been in the neighborhood of approximately two volts but in accordance with the present invention the applied voltage is reduced to a voltage of between 10 and 30 millivolts. The circuit-closing means that is lowered into the well has the points thereof usually formed of two unlike metals, that is, the body of the instrument and the tubing-engaging fingers are usually formed of steel whereas the contact that is mechanically engaged by the fingers is usually formed of brass or bronze. When the circuit-closing means encounters the salt water in the well, these unlike metals, being thus immersed in the salt water electrolyte, become the poles of a galvanic cell generating a small amount of electric current. By having the applied voltage and the voltage developed by this galvanic cell arranged in opposition to each other, the short-circuiting effect of the salt water is largely, if not entirely, neutralized so that the surface indicator is not actuated or is only actuated to a minor degree until such time as the circuit-closing means mechanically causes the circuit to be closed. In this manner it is possible in accordance with the present invention to largely eliminate the short-circuiting effect of the salt water encountered in oil wells and to obtain a highly accurate record on the surface indicator of when the electrical circuit is mechanically closed by the instrument lowered into the well.

With the foregoing and other objects in view, which will be made manifest in the following detailed description and specifically pointed out in the appended claims, reference is had to the accompanying drawings for an illustrative embodiment of the invention wherein:

The figure is a schematic diagram of an apparatus used in accordance with the present invention.

Referring to the accompanying drawings wherein similar reference characters designate similar parts throughout, T indicates the tubing to be tested as to its wall thickness. The instrument employed for this purpose consists of a suitable body generally indicated at 10 which has pivotally mounted thereon on pivots 11 a plurality of fingers 12. These fingers have their lower ends urged outwardly such as by springs 13 into engagement with the interior of the tubing T. The upper ends of the fingers are arranged to traverse the bottom edge of an insulated ring 14 which is insulated from the body 10 such as by insulation 15. Centering springs 16 and 17 which are also engageable with the interior of the tubing serve to hold the body centrally with relation to the tubing as the instrument is drawn therethrough. If the tubing T is of normal wall thickness, then the fingers 12 will remain in the full line position shown wherein the ring 14 is not engaged by their upper ends. On the other hand, if a section of tubing of subnormal wall thickness is encountered, one or more of the fingers may expand into the dotted line position shown wherein the upper end of any expanded finger will engage the bottom surface of the insulated ring 14 thus closing the electric circuit. The ring 14 is electrically connected to a lowering cable or line 18 within which there is an insulated electrical conductor 19.

The applied current is supplied from a battery 20, the terminals of which are connected across a voltage divider or potentiometer indicated at 21. This voltage divider in turn is connected to a conductor 22 through a millivolt meter 23 to the conductor 19. A conductor 24 leads from one side of the potentiometer 21 to an interrupter 25 which in turn is connected by a conductor 26 to ground or to the tubing T. The interrupter 25 in turn is connected to an amplifier 27 which in turn is connected through a rectifier 28 and a volt meter 29 to a conventional pen recorder 30. Across the conductors 19 and 26 there is connected a short-circuiting switch 31 which is in series with a variable resistance 32.

In the use of a tool of this character as performed heretofore, the applied voltage supplied by the battery 20 directly to the tubing tester has been in the neighborhood of from 2 to 6 volts inasmuch as no voltage divider or potentiometer 21 was employed. When the tubing tester was lowered into a tubing filled with oil the oil having no great conductivity would not short circuit between the fingers 12 and the ring 14. Consequently, no record or indication would be made on the pen recorder 30 until such time as the fingers 12 encountered tubing of subnormal wall thickness. When this occurred one or more fingers 12 would be expanded or pivoted on their pivots 11 so that these fingers would engage the ring 14 closing the electric circuit and causing the pen recorder 30 to be actuated to make a record or an indication of such tubing.

However, when salt water was encountered the conductivity of the salt water would short circuit or close the circuit between the fingers 12 and the ring 14 so that even though none of the fingers 12 might mechanically engage the ring 14 the pen recorder 30 would nevertheless be actuated.

In accordance with the present invention, inasmuch as the ring 14 is formed of brass and the body of the tool, including the fingers 12, is usually formed of steel, the tool on entering the salt water becomes a galvanic cell generating a minor amount of electric current with the tool and its fingers becoming the negative pole of such cell and the ring 14 becoming the positive terminal thereof. Consequently, an electrical potential would be generated by the tool itself in the direction indicated by the arrow opposite the cable 18, that is, the tool and the tubing T would become the negative while the conductor 19 would be positively charged. The amount of current generated by this galvanic cell formed by the tool itself is, of course, very small but as the conductor 19 is connected to the negative side of the millivolt meter 23 it is sufficient to cause the needle and the millivolt meter to attempt to swing below zero. To compensate for this the voltage divider or potentiometer 21 is adjusted so that the voltage supplied through conductor 22 is slightly below the voltage generated by the tool itself. Usually this adjustment is made by closing the short-circuiting switch 31 before the tubing tester is lowered into the tubing and adjusting the variable resistance 32 to substantially equal the resistance of the conductor 19. The short-circuiting switch 31 is then opened and is allowed to remain open after which the tool is lowered into the tubing. Whenever the tool is immersed in oil or other relatively non-conducting medium, no current will flow until such time as one or more of the fingers 12 expand to cause their upper ends to engage the ring 14. As the applied current supplied from the battery 20 is direct current, the closing of the circuit between 12 and 14 causes an interrupted direct current to be supplied from the interrupter 25 to the amplifier 27. The interrupter 25 may be any suitable means for interrupting the direct current in the circuit closed by the fingers 12 engaging the ring 14. The interrupted current may, of course, be amplified by the amplifier which may be of any conventional construction and after having been amplified the current delivered therefrom is rectified by the rectifier 28. The use of such rectifier is necessary only because the usual pen recorder 30 is operated by direct current.

When salt water is encountered in the tubing such salt water, instead of acting as a conductor, short-circuiting between the fingers 12 and the ring 14, causes the tool to function as a galvanic cell in opposition to the current supplied from the battery 20 through the potentiometer 21. If the voltage supplied by the tool is in excess of the voltage supplied through conductor 22 from the potentiometer, this is observable on the millivolt meter 23 and by adjusting the potentiometer 21 the needle of the millivolt meter 23 may be returned to zero when the fingers 12 are out of engagement with the ring 14. Consequently, even though the tool may be in salt water, due to the opposition of the two voltages no current is flowing through the circuit to be amplified by the amplifier 27. Under these circumstances it is only when the fingers 12 mechanically close the circuit by engaging the ring 14 when the fingers have encountered tubing of subnormal wall thickness that current will flow through the circuit, be interrupted by the interrupter 25, amplified by the amplifier 27, rectified through the rectifier 28, and used to actuate the pen recorder 30.

From the above described construction it will be appreciated that an improved method and apparatus has been developed for actuating a surface indicator or recorder by a circuit-closing means which is adapted to be lowered into a well and encounter salt water therein. The short-circuiting effect of the salt water across the contacts of the circuit-closing means while in open circuit position is effectively neutralized by causing the tool itself to be so constructed that when immersed in salt water it becomes a galvanic cell so arranged that the voltage generated thereby will be opposed to the supplied voltage. It is, of course, possible to accomplish nearly the same effect but with a greater potential by attaching a piece of zinc to the body 10 which is insulated therefrom and electrically connected to the conductor 19. This zinc, together with the steel of the body, would likewise form a galvanic cell functioning in the same manner. In the usual situation, however, as the ring 14 is already formed of brass or bronze, the use of such additional zinc is unnecessary.

Various changes may be made in the details of construction without departing from the spirit and scope of the invention as defined by the appended claims.

I claim:

1. The method of testing in wells comprising introducing into the tubing a circuit closing means operable to close an electric circuit when defective tubing is encountered, said circuit closing means being characterized by being effective to generate an electromotive force when immersed in salt water, applying to the contacts of the circuit closing means a voltage in opposition to the electromotive force generated by the circuit closing means, the applied voltage being of a magnitude substantially equal to that generated by the circuit closing means so that substantially no current flows through the electric circuit, moving the tester through the well into a salt water zone and onward until defective tubing is encountered to close the circuit thereby stopping the galvanic effect, and measuring the current flowing in the electric circuit during the testing operations.

2. The method of testing in wells comprising introducing into the tubing a circuit closing means operable to close an electric circuit when defective tubing is encountered, said circuit closing means being characterized by being effective to generate an electromotive force when immersed in salt water, applying to the contacts of the circuit closing means a voltage in opposition to the electromotive force generated by the circuit closing means, the applied voltage being of a magnitude substantially equal to that generated by the circuit closing means so that substantially no current flows through the electric circuit, moving the tester through the well into a salt water zone and onward until defective tubing is encountered to close the circuit thereby stopping the galvanic effect to allow current to flow in the electric circuit under the influence of the applied voltage, interrupting the electric circuit, and amplifying the interrupted voltage in the electric circuit to determine when the circuit closing means is closed.

ARTHUR H. BRANDON.

REFERENCES CITED

The following references are of record in the file of this patent:

UNITED STATES PATENTS

| Number    | Name    | Date           |
|-----------|---------|----------------|
| 2,322,343 | Brandon | June 22, 1943  |
| 2,392,357 | Bays    | Jan. 8, 1946   |
| 2,397,255 | Ennis   | Mar. 26, 1946  |
| 2,415,636 | Johnson | Feb. 11, 1947  |
| 2,427,950 | Doll    | Sept. 23, 1947 |